June 1, 1954           D. PARRETT           2,679,769
POWER TAKE-OFF CONTROL FOR FARM TRACTORS
AND OTHER MOTOR VEHICLES
Filed April 27, 1950           3 Sheets-Sheet 1
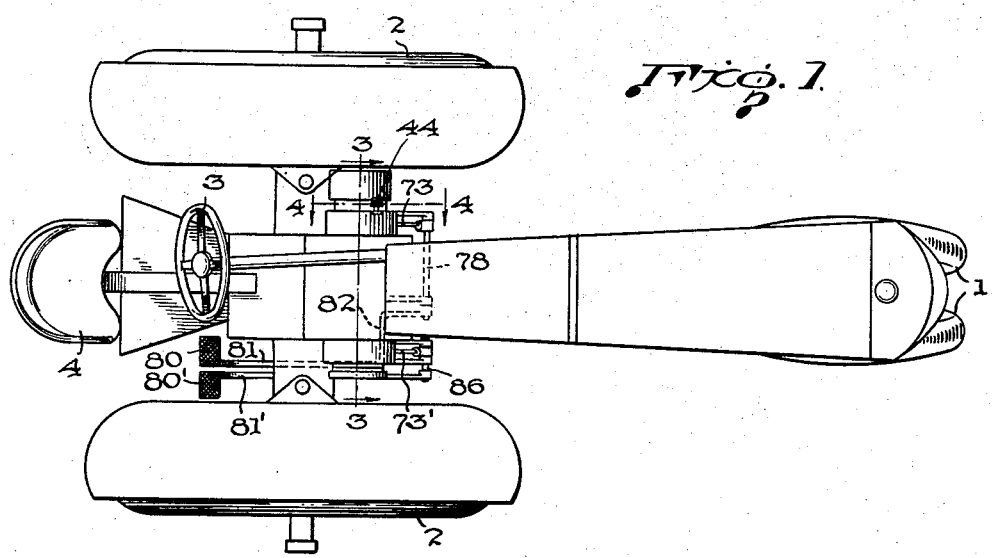
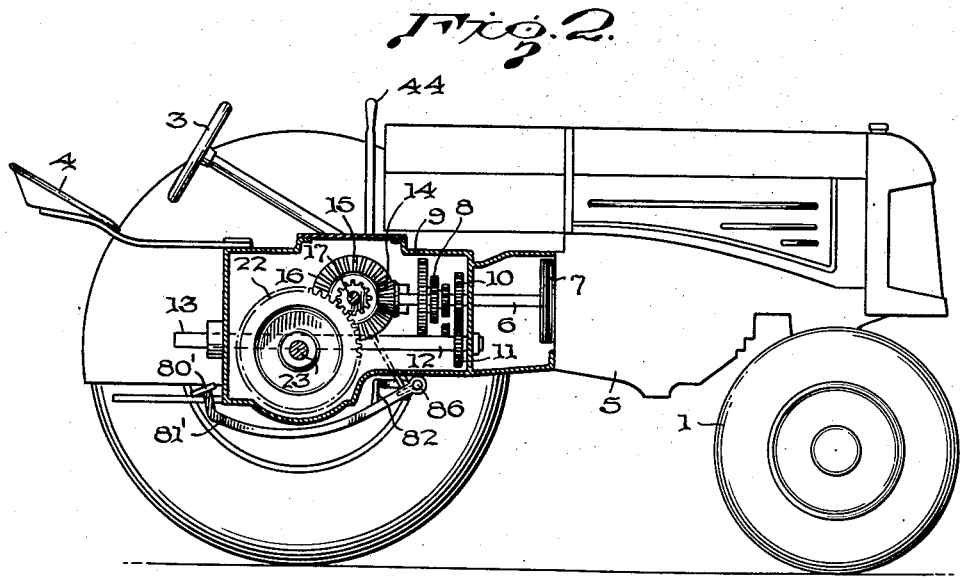
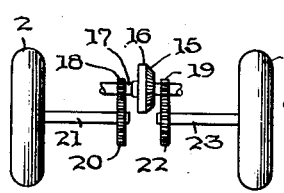
INVENTOR.
Dent Parrett
BY Robert Cobb
Attorneys

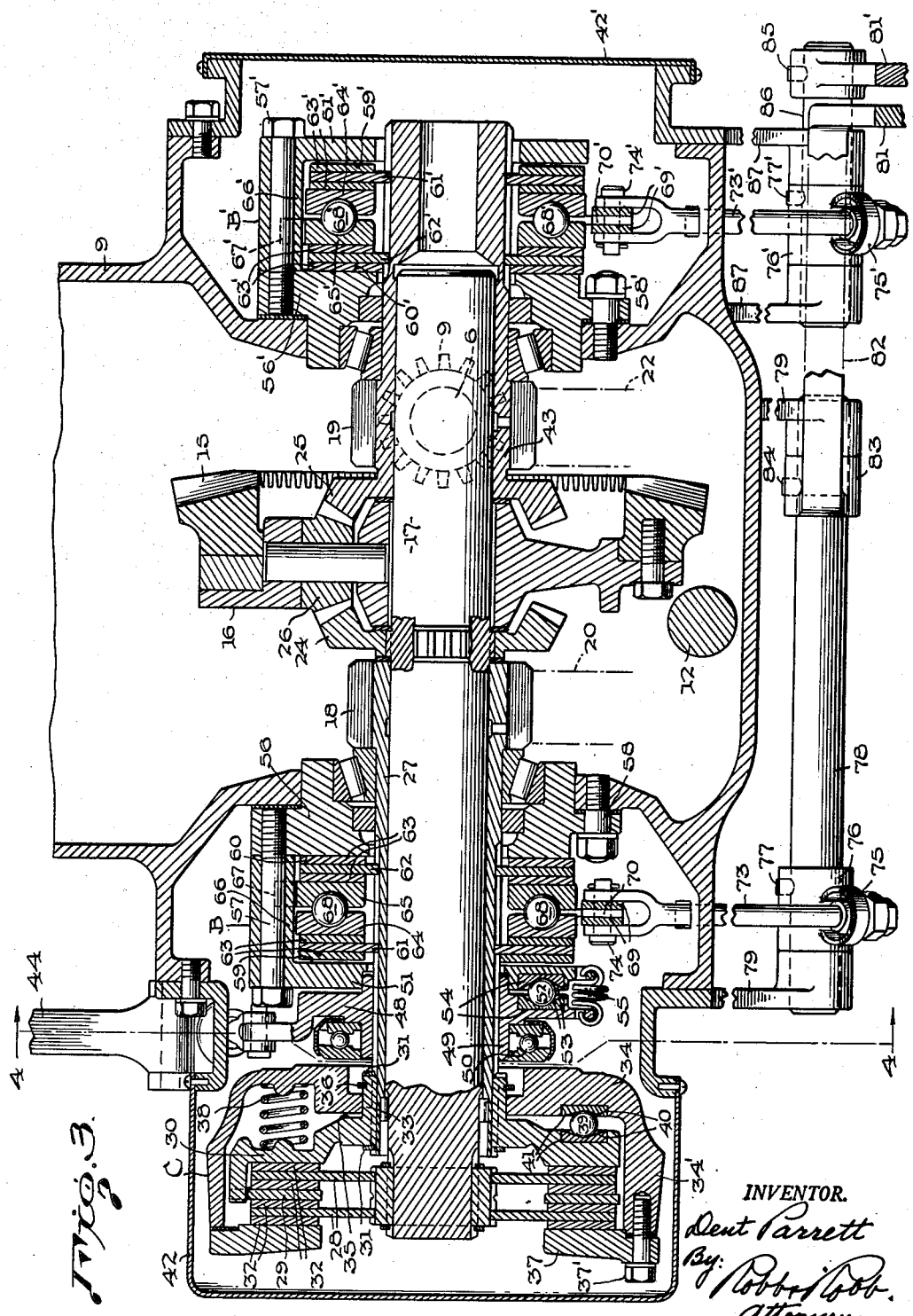

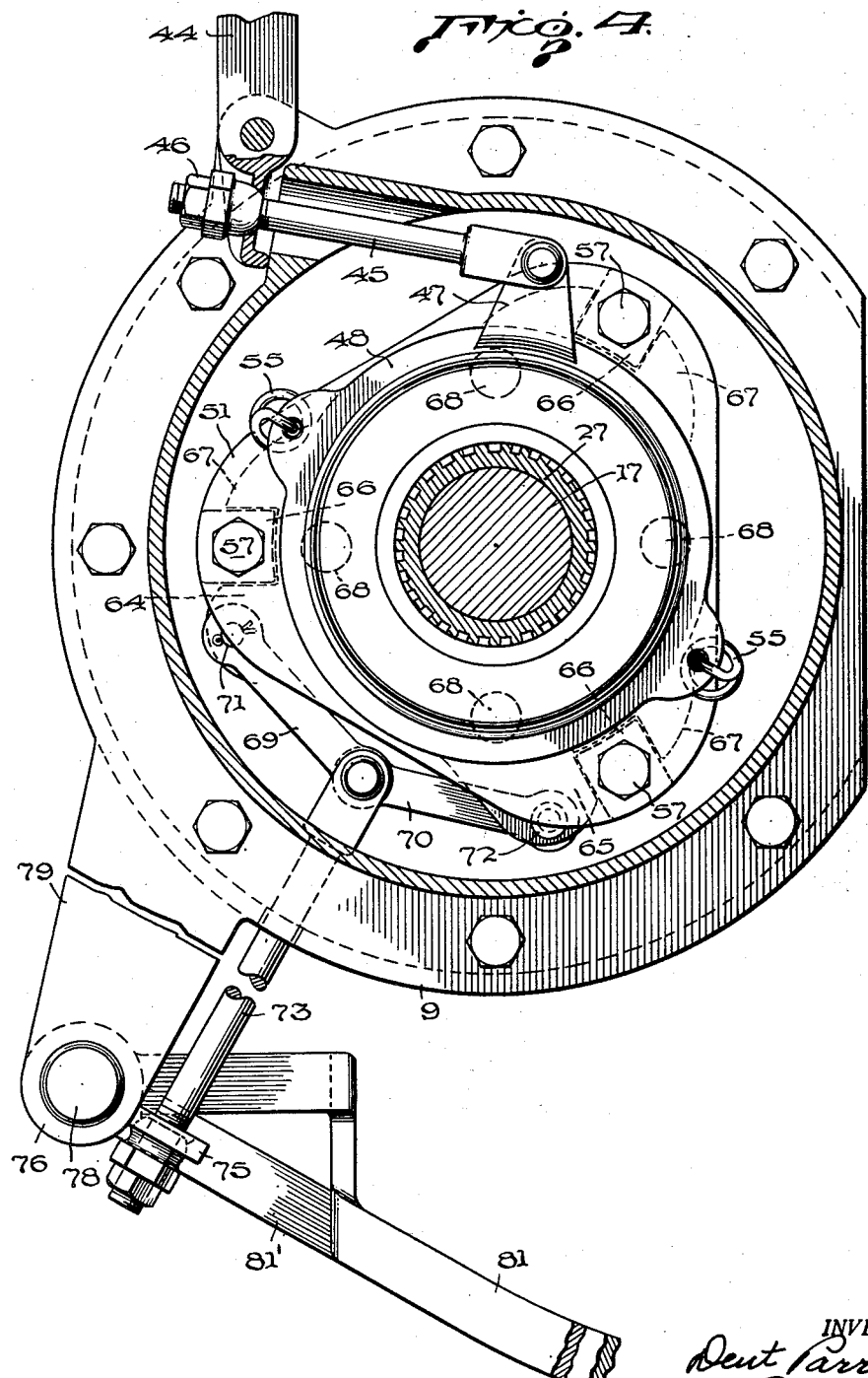

Patented June 1, 1954

2,679,769

UNITED STATES PATENT OFFICE 2,679,769

POWER TAKE-OFF CONTROL FOR FARM TRACTORS AND OTHER MOTOR VEHICLES

Dent Parrett, St. Joseph, Mich., assignor, by mesne assignments, to Lambert Brake Corporation, St. Joseph, Mich., a corporation of Michigan Application April 27, 1950, Serial No. 158,500

7 Claims. (Cl. 74—710.5)

The present invention relates primarily to power take-offs for farm tractors and similar motor vehicles, and more particularly, to control means for such power take-offs. It is to be understood, however, that the invention is not limited to use for such vehicles, since it may readily be applied or adapted to other power transmissions to selectively control the transmission of power through different gear trains, driving shafts, or equivalent rotary elements.

In most of the conventional farm tractors now manufactured and in use, the power take-off shaft (which is sometimes provided as standard equipment and sometimes as optional equipment) is usually connected by a sliding gear or jaw clutch, to the output or rear end of the tractor engine, and behind the main clutch which controls the transmission of power to the usual rear traction or drive wheels of the tractor. Consequently, the main clutch must be engaged in order to operate the power take-off shaft, but when it is so engaged, the power is simultaneously transmitted to the traction wheels, unless the main clutch is first disengaged to permit shifting the speed-change-gear transmission into neutral and then re-engaged, thereby at least momentarily interrupting operation of the power take-off shaft. In other words, the power take-off shaft cannot be continuously operated without interruption unless the tractor is in continuous motion.

The aforementioned condition is a distinct disadvantage, since in some farm operations, it is desirable to continue operation of the power take-off shaft without interruption while the tractor is brought to a stop and held stationary, with the traction drive interrupted. For example, in the operation of combines, hay balers and similar equipment, when drawn by tractors and also driven by the power take-off of the tractor, the materials entering the combine or the baler, as the case may be, as the tractor pulls the same along, oftentimes exceeds the normal feed rate, and results in piling up or choking of the machine. When this occurs, it is desirable to temporarily discontinue the forward motion of the tractor and the machine drawn thereby, and to allow the power take-off to continue in operation without interruption until the combine or baler is cleared of accumulated excess materials, before again resuming the forward travel of the vehicles. This cannot be done with the power take-off equipment heretofore available on conventional farm tractors.

Accordingly, it is the primary object of the present invention to provide an improved control means for power take-offs for farm tractors and the like, said control means being so constructed and arranged as to permit continuous operation of the power take-off either with or without interruption of the traction drive of the tractor.

In attaining the aforementioned objective, I utilize a novel and improved clutch and brake combination, preferably interposed between the usual differential and one of the traction wheels of the tractor, with the clutch serving to selectively connect or disconnect, at will, the differential with the traction wheel, and the brake serving to selectively brake or release the traction wheel, as the circumstances require.

A further object of the invention is to provide a new and improved brake mechanism for the traction wheels of farm tractors or the like, wherein the brake of the aforementioned clutch and brake combination or assembly serves either to aid in holding the tractor stationary, or to assist in steering the tractor, as is sometimes desirable in the cultivation of row crops. In this connection, I preferably provide a separate and independently operable brake for each traction wheel of the tractor, said brakes being preferably identical with each other, but one of said brakes being operatively assembled and combined with an auxiliary clutch for selectively controlling the power transmission to the tractor wheels without interruption of the operation of the power take-off, as hereinbefore described.

Another object of the invention is to provide an improved clutch and brake assembly of the aforementioned character which may be applied or adapted to conventional farm tractors or other motor vehicles with a minimum of revision or modification of the existing designs, and when installed, is readily accessible for service and repair.

Other and further objects and advantages of the invention will be hereinafter described and the novel features thereof defined in the appended claims.

In the drawings:

Figure 1 is a top plan view of a conventional farm tractor, showing my invention applied thereto;

Figure 2 is a view of the tractor in side elevation, with one of the traction wheels omitted, and other parts broken away and shown in section;

Figure 3 is an enlarged transverse sectional view taken on the line 3—3 of Figure 1, and showing more particularly the details of the clutch and brake assembly;

Figure 4 is an enlarged vertical sectional view taken on the lines 4—4 of Figures 1 and 3; and Figure 5 is a detail view on a reduced scale, showing the gear drive between the traction wheels and the differential assembly.

Like reference characters designate corresponding parts in the several figures of the drawing, wherein Figures 1 and 2 show a conventional farm tractor equipped with the usual steerable wheels 1 at the front end thereof, and provided at the rear with two large traction wheels or driving wheels designated 2. The front wheels 1 are adapted to be steered in the usual manner by means of the steering wheel 3 which is accessible from the operator's seat 4, and in addition, steering of the tractor may be aided by brakes acting upon the main traction or drive wheels 2 in a manner which will be hereinafter more fully described.

The traction power for driving the tractor is derived from an engine generally indicated at 5, which is mounted near the forward end of the tractor, said engine being connected to a main drive shaft 6 which extends rearwardly from the rear end of the engine 5, said drive shaft 6 being controlled in the usual manner by a main clutch generally indicated at 7, which clutch is positioned, as usual, near the rear end of the engine 5 and at the front of the drive shaft 6. This main clutch 7 is controlled by suitable control means (not shown) accessible to the operator when seated on the seat 4 of the tractor.

Connected to the main drive shaft 6 and driven thereby is the usual speed-change-gear mechanism generally indicated at 8, which mechanism may be selectively controlled by suitable control means (not shown), usually having the form of a gear shift, to vary the speed ratio of the traction drive.

Just ahead of the speed-change-gear mechanism which is located in the main transmission housing 9, the drive shaft 6 is provided with a gear 10 which is fixed to the shaft 6 for rotation therewith, said gear 10 meshing with a gear 11 on the forward end of a power take-off shaft 12 which extends rearwardly to the back of the tractor and projects somewhat beyond the rear end of the tractor as indicated at 13, and constituting a power take-off for transmitting power from the tractor engine 5 to other machinery which may be suitably connected to or drawn by the tractor in a well-known manner. The power take-off mechanism just described is sometimes provided as standard equipment on many conventional farm tractors, while at other times it is furnished or applied to the tractor as special equipment, but in either case, the arrangement illustrated in Figures 1 and 2 is typical and illustrative of a well-known and frequently used power take-off mechanism.

It will be understood from the foregoing that as long as the main clutch 7 is engaged, power will be transmitted from the engine 5 through the power take-off mechanism in a continuous manner, although, if desired, the main clutch 7 may be temporarily disengaged to permit shifting of the change-gear-mechanism 8 into neutral, and then the clutch 7 can be re-engaged to resume operation of the power take-off. However, this practice necessitates at least a momentary or temporary interruption of the power take-off drive which is sometimes undesirable in certain farming operations, particularly where this would result in resuming the power take-off drive under a relatively heavy load.

In some of the usual power take-off drives, the gear 10 or the gear 11 may be slidable relative to each other so as to permit engagement or disengagement of the gears, at will, or a jaw clutch (not shown) may be interposed in this gear drive to permit interruption or resumption of operation of the power take-off. Whatever the arrangement may be, it has no material bearing on the present invention, and therefore need not be illustrated or further described.

Fixed to the rear end of the main drive shaft 6 and rotatable therewith in the transmission housing 9 is a beveled pinion 14 which continuously meshes with a beveled ring gear 15 of a conventional differential generally indicated at 16. This differential 16 is mounted on a countershaft 17 which extends transversely across the transmission housing 9 from side to side thereof. Suitably mounted on the countershaft 17 at each side of the differential 16 are two pinions respectively designated 18 and 19. The pinion 18 meshes with a main drive gear 20 which is fixed on the inner end of a driven shaft 21, said shaft 21 being fixed at its outer end to one of the traction or drive wheels 2 of the tractor. The other pinion 19 similarly meshes with another main drive gear 22 which is fixed on the inner end of a separate driven shaft 23, and to the outer end of the latter shaft is connected the other traction or drive wheel 2. It will be understood from the foregoing that the traction wheels 2, 2 are driven by the main drive shaft 6 through the differential 16, as will be best seen from reference to Figure 5 of the drawings. In order to permit continuous and uninterrupted operation of the power take-off hereinbefore referred to, while holding the tractor at a standstill, it is necessary to provide suitable control means permitting interruption of the traction drive, at will, and without disturbing the main clutch 7 which must remain engaged in order to continue operation of the power take-off. The control means just referred to, and to which the present invention is primarily directed, will now be particularly described.

Referring now to Figures 3 and 4 of the drawings, it will be seen that the differential 16 is supported on the countershaft 17 which extends coaxially through the differential, and that the differential assembly includes two beveled gears designated 24 and 25 which mesh with an intermediate pinion 26 which is so supported by the frame of the differential as to be rotatable about an axis transverse to the central axis of the countershaft and ring gear 15. The beveled gear 24 is preferably splined on the countershaft 17, as indicated in section in Figure 3.

It will be seen that the drive gear 18 is coaxial with the countershaft 17, but is carried by a hollow shaft 27 to which the gear 18 is suitably pinned, keyed or made as an integral forging with the gear 18, as preferred. This hollow shaft 27 is rotatably supported on the countershaft 17, and extends to the left, as viewed in Figure 3, somewhat beyond the lefthand side of the transmission housing 9, but terminates at its outboard end somewhat short of the outboard end of the countershaft 17 itself. On the extreme outboard end of the countershaft 17, there is mounted a plurality of clutch discs or plates designated 28, said clutch discs being so assembled as to be rotatable with the countershaft 17, but free to move axially thereon towards and away from each other. While two clutch discs have been shown in the drawings, it is to be understood that the number of discs may be varied, if desired, according to the load to which the clutch assembly is normally subjected. Intermediate the clutch discs 28 is disposed an annular friction disc or ring 29 which is axially shiftable on a marginally flanged plate 30 which in turn is keyed, splined or otherwise suitably fixed to the outboard end of the hollow shaft 27, and held against axial displacement thereon as by means of snap thrust rings 31, 31 located respectively on opposite sides thereof. Thus, the plate 30 is rotatable with the hollow shaft 27, and the intermediate friction disc 29 is supported by the plate 30 so as to be rotatable therewith, but free to float between the discs 28, the latter discs being preferably provided with friction lining material 32 on the opposite faces thereof.

The plate 30 is provided with a central axially extended hub 33 on which is slidably mounted a marginally flanged disc or plate 34, the axial movement of said plate or disc 34 being limited in the released condition of the clutch by balls or rollers 39 seating in the bottom of the opposed ramps or camming seats 40, as hereinafter described, and by a snap thrust ring 36 mounted near the inboard end of hub 33, said snap ring being provided as a convenient means for holding the clutch assembly intact while it is being mounted on the hollow shaft 27. The outer marginal flange of the plate or disc 34 is extended around the discs 30, 29, 28, to the outboard side of the latter, as indicated at 34', and suitably attached to the outboard face of the flange 34' is an annular disc or ring 37 which is opposed to but axially spaced from the outboard face of the disc 30, these opposed faces forming friction surfaces for engagement with the clutch discs 28 when the clutch is engaged. The clutch assembly as a whole is generally indicated in the drawings by the reference C, and its operation will be obvious from the foregoing description.

As is customary in such clutches, the clutch is normally and yieldingly urged into an engaged condition by a plurality of coil springs interposed between the discs 30 and 34, and arranged in equidistantly spaced relation to each other about the axis of the clutch. Also interposed between the discs 30 and 34 is a plurality of equidistantly spaced balls or rollers 39, which are located intermediate the springs 38, said balls or rollers seating between oppositely inclined, opposed ramps or camming seats 40 formed either directly in the opposed faces of the discs 30, 34, or in opposed inserts 41 which in turn are recessed in these discs, as shown in Figure 3 of the drawings. Thus, as the clutch is engaged, the load is imposed thereon and transmitted through the clutch, the plate 34 is free to rotate slightly relative to the plate or disc 30, thereby causing these plates or discs to be axially spread apart by the camming action of the balls 34 which roll on the inclined ramps or camming surfaces 40, thereby aiding the springs 30 to engage the discs, and assuring a more positive clutch engagement.

To protect the clutch, a removable cover 42 is attached to the outboard side of the transmission housing 9, said cover extending about the clutch assembly. However, the clutch is readily accessible for service and repair on removal of the cover 42, as will be obvious from the drawings.

When the clutch plates or discs are disengaged, any rotation imparted to the countershaft 17 by the differential 16 will simply cause the discs 28 to freely rotate with this countershaft, but without transmitting any power to the hollow shaft 27 on which the discs 29 and 30 are mounted, and therefore no rotation will be imparted to the hollow shaft 27 or to the drive pinion 18 which is carried thereby. Consequently, no power or rotation will be imparted to the traction or drive wheel 2 which is normally driven by the pinion 18 through the drive gear 20. Under the same conditions, no power will be transmitted to the traction or drive wheel on the opposite side of the tractor, due to the action of the differential 16, as will be readily understood by those skilled in the art. Accordingly, only a single clutch C is required to control or effect interruption of the traction wheel drives. However, on engagement, both traction wheels will be powered and driven in the conventional manner, it being understood that the wheel on the righthand side of the tractor, as viewed in Figures 3 and 5, is driven by pinion 19 which is formed as a part of or otherwise suitably fixed to a tubular sleeve or extension 43 preferably formed as an integral part of the beveled differential gear 25, said gear 25 and extension 43 being free to rotate on the countershaft 17, and being suitably journaled or supported in the righthand side of the transmission housing 9, with the sleeve 43 extended somewhat beyond the outboard side of the transmission housing.

In order to control the operation of the clutch C, there is provided a control member 44, which is shown in the drawings as having the form of a hand-operated lever accessible to the operator when seated on the tractor seat 4, but which may have the form of a foot-operated pedal, if preferred, said member 44 being pivotally mounted on the side of the transmission housing, as indicated in Figures 3 and 4, and being connected to an adjustable link 45 having an adjusting nut 46 on one end thereof as shown in Figure 4. The opposite end of the link 45 is pivotally connected to a radially offset ear 47 which is extended generally upwardly from a plate 48 which is rotatably mounted upon the hollow shaft 27 and is free to shift rotatively relative thereto, responsive to pivotal or rocking motions of the operating member 44. The plate 48 is preferably provided with an axially extended hub or sleeve 49 on which is mounted a thrust bearing 50 which is preferably of the antifriction type, as shown in Figure 3, although it is to be understood that a plain thrust washer may be substituted for the antifriction bearing 50, if preferred. The thrust bearing 50 is interposed between the plate 48 and the plate or disc 34 of the clutch C. On the opposite side of the plate 48 is a fixed plate or disc 51 which forms a part of a brake assembly or brake unit, generally designated B. Disposed between the plates 48 and 51 is a plurality of equidistantly spaced balls or rollers 52 seating either in oppositely inclined seats or ramps 53 directly formed in the plates themselves, or provided in opposed inserts 54, 54, as shown in Figure 3. A plurality of coil springs 55, arranged at equidistantly spaced intervals about the central axis of the plates 48, 51, and interconnected at their opposite ends with the respective plates, serve to urge the plate 48 towards the plate 51, with the balls 52 seated in the deepest part of the inclined seats or ramps 53, this position of the plate 48 corresponding to the position assumed when the clutch B is engaged.

However, upon shifting the actuating member 44 to cause relative rotation of the plate 48 in one direction or the other, about the central axis of the countershaft 17, the balls tend to axially shift the plate 48 away from the plate 51 pursuant to the action of the inclined ball seats, thereby forcing the thrust bearing 50 against the plate or disc 34 and axially shifting this plate together with the disc or plate 37 attached thereto by bolts 37', to the left as viewed in Figure 3, which in turn compresses the springs 38, and causes the clutch discs or plates to disengage and release the clutch.

Referring now to the brake assembly B, and having particular reference to Figures 3 and 4 of the drawings, it will be seen that the plate or disc 51 is fixed to another plate or disc 56 by means of a plurality of equidistantly spaced bolts 57, and that said plate or disc 56 is in turn bolted or otherwise suitably anchored to the transmission housing 9, as by means of bolts 58. Thus, the two discs or plates 51 and 56 are rigidly held in a fixed or stationary position, with the discs or plates axially spaced apart for a substantial distance, and providing opposed annular braking or friction surfaces 59 and 60 on the opposed inner faces thereof.

Disposed between the discs or plates 51 and 56 are two friction discs 61 and 62, these friction discs being preferably provided with friction linings 63 on the opposite faces thereof. Both discs 61 and 62 are suitably splined on the hollow shaft 27 so as to be rotatable with the latter shaft, but free to move axially thereon towards and away from each other. Also surrounding the hollow shaft 27 and disposed between the discs 61, 62, is a pair of actuator discs or plates respectively designated 64 and 65, said actuator discs or plates being piloted within a plurality of shoulders 66 formed integrally with the plate 51 and extended axially therefrom into abutting engagement with the plate or disc 56, with the connecting bolts 57 extended through these shoulders and threadedly secured to the plate 56.

Each of the discs or plates 64, 65 is provided with a plurality of equidistantly spaced lugs or ears 67 radially extended therefrom and constituting stop lugs which coact with the respective shoulders 66 to limit relative rotative movements of the actuator discs 64, 65, while at the same time allowing axial movement of these actuator discs towards and away from each other.

Disposed intermediate the actuator discs 64, 65, and arranged in equidistantly spaced relation to each other around the central axis thereof, is a plurality of balls 68, each of said balls seating in oppositely inclined seats or ramps formed in the opposed faces of the respective actuator discs 64, 65.

Pivotally connected to the respective actuator discs 64, 65 is a pair of links respectively designated 69 and 70, the link 69 being connected by a pin 71 to one of the discs, such as 64, and the link 70 being pivotally connected by a pin 72 to the other disc, such as 65. The two links 69 and 70 are in turn pivotally connected together and to a draw link 73, as by means of a pin 74, said draw link 73 in turn being adjustably connected to an arm 75 radially extended from a collar or sleeve 76 fixed by a set screw 77, or in any suitable manner, on a rock shaft 78 which in turn is journaled in brackets 79 mounted on the transmission housing 9.

The construction and operation of the brake assembly B just described is generally similar to that shown and described in my prior Patent No. 2,387,039, granted October 16, 1945. It will accordingly be understood that upon rotation of the rock shaft 78 in one direction, a pull will be exerted on the pull link 73, and consequently upon the two links 69 and 70, thereby causing relative rotation of the actuator discs 64 and 65 in opposite directions until the stop lugs on one of said discs engage the shoulders 66 and leaving the other actuator disc free to rotate slightly relative to the stationary actuator disc. This relative rotation of the two actuator discs 64, 65 causes the discs to be axially separated by the camming action of the balls 68 as they roll on the inclined ramps or seats in which the balls are seated between the two discs, thereby spreading the friction discs 61, 62 apart and into braking engagement with the stationary discs or plates 51, 56. Upon rotation or rocking of the rock shaft 78 in the opposite direction, the braking action of the brake will be released, and the various discs will disengage each other to an extent sufficient to provide a running clearance, at which time the balls 68 will assume a position at or near the deepest part of their seats or inclined ramps in the actuator discs 64, 65.

Operation of the rock shaft 78 may be effected by any suitable operating instrumentality, but is preferably controlled by a foot-operated brake pedal 80 which is disposed so as to be conveniently accessible to the operator's foot when seated upon the seat 4 of the tractor. The pedal 80 is carried by an arm 81 having a transversely offset extension 82 connected at its free end to a sleeve or collar 83 which is anchored by a set screw 84 or in any other suitable manner to the rock shaft 78.

An identical or generally similar brake assembly designated B' is provided at the righthand side of the transmission housing 9 as viewed in Figure 3, which brake assembly serves to permit braking applications to be made on the righthand drive wheel of the tractor, as distinguished from the lefthand drive wheel which is controlled by the brake assembly B. Since the parts of the brake assembly B' are identical or similar to those of the brake assembly B, these parts are identified by the same reference characters which are primed. It will be observed that the friction discs 61' and 62' are splined on the axially extended sleeve or hollow shaft 43 which extends from the differential beveled gear 25 and the drive gear 19 which drives the righthand traction wheel 2 of the tractor through the main drive gear 22.

A second brake pedal 80' is provided to control the operation of the brake assembly B', said pedal 80' being carried by an arm 81' which is fixed by a set screw 85, or otherwise anchored in any other suitable manner to a rock shaft 86 which is journaled in brackets 87 extended from the transmission housing 9.

By disposing the two brake pedals 80 and 80' relatively close together and on the same side of the tractor vehicle, they may be readily operated independently by the same foot of the tractor operator, and thereby permitting convenient selective operation of the respective brake assemblies B and B' as may be desired to aid in steering the tractor. On the other hand, being disposed relatively close together, both brake pedals 80 and 80' may be simultaneously operated by the same foot of the tractor operator to apply both brakes and to thereby brake both traction wheels of the tractor as may be desired to hold the tractor stationary, yet at the same time permitting the power take-off to remain in operation by disengagement of the clutch C under the control of the actuating lever 44.

It is to be understood, however, that the clutch C and the brakes B and B' hereinbefore described and illustrated in the drawings, are merely illustrative of suitable brake and clutch constructions which may be employed in attaining the objectives of the present invention, and that the invention is not limited to these specific clutch and brake constructions. On the other hand, the specific brake and clutch constructions illustrated and described herein have been found to be the most practical for the purposes intended and may be utilized with or applied to conventional farm tractors with a minimum of revision or change in existing tractor designs, while at the same time providing a clutch and brake arrangement which is always readily and easily accessible for service and repair of the clutch and brake assemblies.

Other changes and alterations and adaptations may be made without departing from the spirit of the present invention, as defined by the appended claims.

I claim:

1. A power transmission mechanism of the class described, comprising a drive shaft, a plurality of driven shafts, a differential operatively connecting said driven shafts to said drive shaft, a power take-off shaft operatively connected to said drive shaft ahead of said differential and continuously operable by said drive shaft, means interposed between said differential and one of said driven shafts for interrupting operation of the driven shafts at will and without interruption of operation of said power take-off shaft, said means including a countershaft continuously operable by said drive shaft through said differential, a hollow shaft coaxially and rotatably mounted upon said countershaft and operatively connected to the last-mentioned driven shaft, cooperative clutch members connected respectively to the countershaft and the hollow shaft aforesaid and engageable with and disengageable from each other at will for selectively effecting rotation of the hollow shaft with the countershaft and for interrupting rotation of the hollow shaft and consequently the driven shafts, and with brake means for braking said hollow shaft, and consequently the driven shaft.

2. A power transmission mechanism of the class described, comprising a drive shaft, a plurality of driven shafts, a differential operatively connecting said driven shafts to said drive shaft, a power take-off shaft operatively connected to said drive shaft ahead of said differential and continuously operable by said drive shaft, means interposed between said differential and one of said driven shafts for interrupting operation of the driven shafts at will and without interruption of operation of said power take-off shaft, said means including a countershaft continuously operable by said drive shaft through said differential, a hollow shaft coaxially and rotatably mounted upon said countershaft and operatively connected to the last-mentioned driven shaft, cooperative clutch members connected respectively to the countershaft and the hollow shaft aforesaid and engageable with and disengageable from each other at will for selectively effecting rotation of the hollow shaft with the countershaft and for interrupting rotation of the hollow shaft and consequently the driven shafts, and brake means for braking said hollow shaft, and consequently the driven shaft, said brake means including a relatively stationary brake member, a cooperative brake member connected to and normally rotatable with said hollow shaft, said latter brake member being selectively engageable with and disengageable from the relatively stationary brake member.

3. Apparatus as defined in claim 1, wherein said cooperative clutch members have the form of friction discs.

4. A power transmission mechanism of the class described, comprising a drive shaft, a plurality of driven shafts, a differential operatively connecting said driven shafts to said drive shaft, a power take-off shaft operatively connected to said drive shaft ahead of said differential and continuously operable by said drive shaft, means interposed between said differential and one of said driven shafts for interrupting operation of the driven shafts at will and without interruption of operation of said power take-off shaft, said means including a countershaft continuously operable by said drive shaft through said differential, a hollow shaft coaxially and rotatably mounted upon said countershaft and operatively connected to the last-mentioned driven shaft, cooperative clutch members connected respectively to the countershaft and the hollow shaft aforesaid and engageable with and disengageable from each other at will for selectively effecting rotation of the hollow shaft with the countershaft and for interrupting rotation of the hollow shaft and consequently the driven shafts, and brake means for braking said hollow shaft, and consequently the driven shaft, said brake means including a relatively stationary brake member having a pair of oppositely disposed and axially spaced annular braking surfaces, a pair of friction discs disposed in coacting relation to the respective braking surfaces aforesaid and axially movable towards and away from the same, said friction discs being interconnected with the hollow shaft so as to be normally rotatable therewith, and means disposed between said friction discs for moving the same towards and away from said coacting braking surfaces.

5. A power transmission mechanism of the class described, comprising a drive shaft, a plurality of driven shafts, a differential operatively connecting said driven shafts to said drive shaft, a power take-off shaft operatively connected to said drive shaft ahead of said differential and continuously operable by said drive shaft, means interposed between said differential and one of said driven shafts for interrupting operation of the driven shafts at will and without interruption of operation of said power take-off shaft, said means including a countershaft continuously operable by said drive shaft through said differential, a hollow shaft coaxially and rotatably mounted upon said countershaft and operatively connected to the last-mentioned driven shaft, cooperative clutch members connected respectively to the countershaft and the hollow shaft aforesaid and engageable with and disengageable from each other at will for selectively effecting rotation of the hollow shaft with the countershaft and for interrupting rotation of the hollow shaft and consequently the driven shafts, and brake means for braking said hollow shaft, and consequently the driven shaft, said brake means including a relatively stationary brake member having a pair of oppositely disposed and axially spaced annular braking surfaces, a pair of friction discs disposed in coacting relation to the respective braking surfaces aforesaid and axially movable towards and away from the same, said friction discs being interconnected with the hollow shaft so as to be normally rotatable therewith, and means disposed between said friction discs for moving the same towards and away from said coacting braking surfaces, said last-named means comprising a pair of actuator discs arranged for both axial and rotative movements relative to each other, and camming means disposed between said actuator discs for axially separating the same into engagement with the friction discs aforesaid responsive to rotative movement of one actuator disc relative to the other actuator disc.

6. A power transmission mechanism of the class described, comprising a drive shaft, a plurality of driven shafts, a differential operatively connecting said driven shafts to said drive shaft, means interposed between said differential and one of said driven shafts for interrupting operation of all of said driven shafts without interrupting operation of said drive shaft, said means including a countershaft continuously operable by said drive shaft through said differential, a hollow shaft coaxially and rotatably mounted upon said countershaft and operatively connected to the last mentioned driven shaft, cooperative clutch members connected respectively to the countershaft and the hollow shaft aforesaid and engageable with and disengageable from each other at will for selectively effecting rotation of the hollow shaft with the countershaft when engaged, and interrupting rotation of the hollow shaft and consequently the driven shaft when disengaged.

7. A transmission mechanism of the class described, comprising a drive shaft, a countershaft, a pair of hollow shafts rotatably mounted on said countershaft, differential gear means cooperatively connecting said countershaft and one of said hollow shafts to said drive shaft, a gear mounted on each of said hollow shafts for rotation therewith to transmit power from said drive shaft to a driven element, clutch means on said countershaft and the other of said hollow shafts for selectively establishing and interrupting rotation of the last-mentioned hollow shaft with the countershaft to establish and interrupt the transmission of power from said drive shaft to said hollow shafts, and brake means for braking the respective hollow shafts, said brake means including a brake element mounted on each hollow shaft for rotation therewith and a cooperative stationary brake element.

References Cited in the file of this patent

UNITED STATES PATENTS

| Number | Name | Date |
|---|---|---|
| 1,042,090 | Covell | Oct. 22, 1912 |
| 1,351,942 | Chapron | Sept. 7, 1920 |
| 1,367,642 | Vanderbeck | Feb. 8, 1921 |
| 1,379,770 | Lucand | May 31, 1921 |
| 1,922,303 | Kinzbach | Aug. 15, 1933 |
| 2,088,110 | Lamb | July 27, 1937 |
| 2,157,273 | Stancil | May 9, 1939 |
| 2,158,935 | Gustafson | May 16, 1939 |
| 2,521,729 | Keese | Sept. 12, 1950 |